(12) United States Patent
Coupvent Des Graviers et al.

(10) Patent No.: US 12,052,527 B2
(45) Date of Patent: Jul. 30, 2024

(54) METHOD AND DEVICE FOR DATING CAMERA IMAGES

(71) Applicant: SAFRAN ELECTRONICS & DEFENSE, Paris (FR)

(72) Inventors: Marc-Emmanuel Coupvent Des Graviers, Paris (FR); Alban Michelangeli, Paris (FR); Thierry Planat, Paris (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 143 days.

(21) Appl. No.: 17/906,205

(22) PCT Filed: Mar. 11, 2021

(86) PCT No.: PCT/FR2021/050416
§ 371 (c)(1),
(2) Date: Sep. 13, 2022

(87) PCT Pub. No.: WO2021/181048
PCT Pub. Date: Sep. 16, 2021

(65) Prior Publication Data
US 2023/0121125 A1    Apr. 20, 2023

(30) Foreign Application Priority Data
Mar. 13, 2020    (FR) ...................................... 2002517

(51) Int. Cl.
*H04N 5/926*    (2006.01)
*H04N 23/60*    (2023.01)

(52) U.S. Cl.
CPC ............. *H04N 5/926* (2013.01); *H04N 23/64* (2023.01)

(58) Field of Classification Search
CPC ...... H04N 5/926; H04N 23/64; H04N 5/0733; H04N 13/239; H04N 13/296;
(Continued)

(56) References Cited

U.S. PATENT DOCUMENTS 7,333,725 B1    2/2008  Frazier
10,368,057 B1*  7/2019  Saran .................... H04N 13/257
(Continued)

OTHER PUBLICATIONS

English translation of Written Opinion mailed May 17, 2021, issued in corresponding International Application No. PCT/FR2021/050416, filed Mar. 11, 2021, 5 pages.
(Continued)

*Primary Examiner* — Mekonnen D Dagnew
(74) *Attorney, Agent, or Firm* — CHRISTENSEN O'CONNOR JOHNSON KINDNESS PLLC

(57) ABSTRACT

A method for dating images obtained by at least one camera equipping a vehicle includes acquiring a reference signal including time information and generating a modulated signal in response to the reference signal. The modulated signal has at least one retiming pulse with a retiming period which that is different from a base period of the modulated signal. The method further includes, for each camera, acquiring images at a frequency depending on the frequency of the modulated signal, each image being associated with a timestamp provided by the camera, and determining the time difference between the timestamps of two successive images of the camera. If the time difference determined between said timestamps is different from the base period of the modulated signal, the method assigns a reference date to said images depending on the time information of the reference signal.

13 Claims, 2 Drawing Sheets

(58) Field of Classification Search
CPC .. H04N 13/204; H04N 13/207; G05D 1/0231; G05D 1/0088; B60W 30/08; G06V 20/56; G01B 11/24

See application file for complete search history.

(56) References Cited

U.S. PATENT DOCUMENTS

| | | |
|---|---|---|
| 10,996,681 B2 * | 5/2021 | Kwan ................. B60W 50/045 |
| 2015/0204983 A1 * | 7/2015 | Georgy ................. G01S 19/396 |
| | | 701/469 |
| 2016/0379058 A1 * | 12/2016 | Tainsh ................... G06V 20/49 |
| | | 382/173 |
| 2018/0082580 A1 | 3/2018 | Thomas et al. |
| 2018/0088584 A1 | 3/2018 | Tascione et al. |

OTHER PUBLICATIONS

International Preliminary Report on Patentability mailed Sep. 6, 2022, issued in corresponding International Application No. PCT/FR2021/050416, filed Mar. 11, 2021, 8 pages.

French Search Report and Written Opinion mailed Nov. 25, 2020, issued in Application No. FR2002517, filed Mar. 13, 2020, 8 pages.

International Search Report mailed May 17, 2021, issued in corresponding International Application No. PCT/FR2021/050416, filed Mar. 11, 2021, 7 pages.

Written Opinion mailed May 17, 2021, issued in corresponding International Application No. PCT/FR2021/050416, filed Mar. 11, 2021, 7 pages.

* cited by examiner

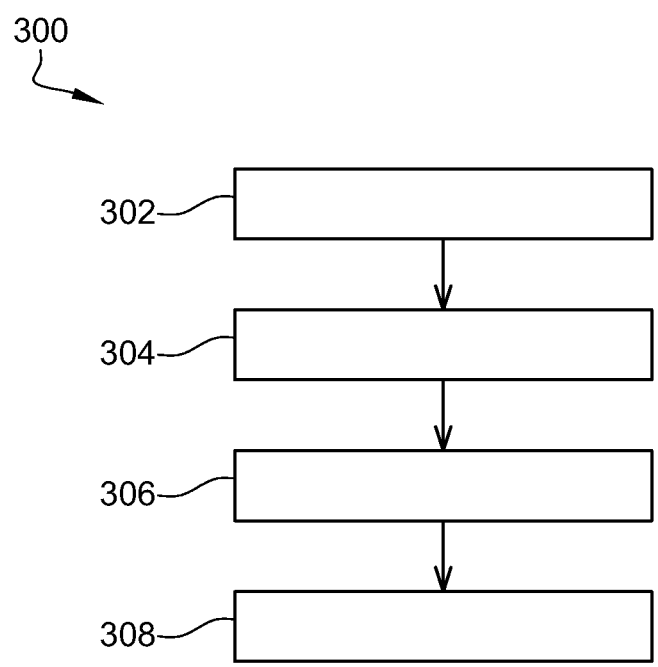

METHOD AND DEVICE FOR DATING CAMERA IMAGES

TECHNICAL FIELD OF THE INVENTION

The invention relates to a method and a device for dating camera images, in particular the cameras on board vehicles.

STATE OF THE PRIOR ART

The autonomous vehicles generally comprise a plurality of sensors for locating these vehicles, for example odometers on the wheels of the vehicles, a receiver of the global positioning system type, an inertial unit, or else cameras in the visible domain. In particular, it is known to use two cameras which are oriented in the same direction and observe the same area to reconstitute a stereoscopic view. Such a pair of cameras, installed on a support, is called a "stereo head".

In order to correctly exploit the data from the various sensors, it is essential to date the recovered data, either from the recording by measuring the instants of measurements of the sensors, or in post-processing, by retiming the data which would not have been dated. An accurate dating of the images of the cameras is required to exploit the vehicle data, essentially to provide an accurate position of the vehicle, in particular when the vehicle is displaced at a high speed. For example, when the vehicle is displaced at 70 km/h (i.e. 20 m/s), an error of 1 ms corresponds to a displacement of the sensor of 2 cm in the direction of travel of the vehicle. Furthermore, the internal clocks of the cameras drift over time and the transfer of the images to a processing module also generates latencies. These latencies vary according to the operation of the links between the camera(s) and the device using the data from these images and can be reduced by an accurate dating of the images.

A device for dating the camera images is known, described in the document US 2003/0052966, comprising a flashing light source arranged in the field of view of the cameras and allowing the dating of the images of the cameras. However, the integration of such a light source and the maintenance of the light source in the field of view of the cameras is expensive and complex to implement, in particular in the case of a moving vehicle. Another solution would consist in equipping each camera with a GNSS receiver in order to accurately date the images taken by said camera, but this solution is not economically viable.

Furthermore, this device does not allow an accurate dating of the camera images.

The invention aims at overcoming these drawbacks in a simple, inexpensive and reliable manner.

PRESENTATION OF THE INVENTION

To this end, the invention relates to a method for dating images obtained by at least one camera, for example two cameras, equipping a vehicle, said method comprising the steps consisting in:
  acquiring a reference signal, in particular periodic, including time information, for example transmitted by a global positioning system equipping said vehicle,
  generating a modulated signal, in response to the reference signal, in particular the modulated signal having a frequency which is higher than the frequency of the reference signal, said modulated signal having at least one retiming pulse having a retiming period which is different from a base period of the modulated signal,
  acquiring images at a frequency depending on the frequency of the modulated signal, in particular at each period of the modulated signal, each image being associated with a timestamp provided by the camera,
  determining the time difference between the timestamps of two successive images of the camera and, if the time difference determined between said timestamps is different from the base period, for example greater than the retiming period, assigning a reference date to said images depending on the time information of the reference signal.

The last image can be considered as being acquired at the time of the retiming period.

Thus, the period of the modulated signal is modified, specifically at the first period of the modulated signal following a pulse of the reference signal, which is the retiming period.

The acquisition of the images by each camera is triggered by the modulated signal which comprises a retiming period of a different duration relative to the base period. At the end of this retiming period, the rising edge of the modulated signal is called a retiming pulse. Thus, the successive images of each camera having a timestamp difference which is different from the base period, correspond to the retiming pulse of the modulated signal and can be dated relative to the reference signal. For each camera, the dating of the images is therefore performed based on the difference between the timestamps and not based on the absolute value of the timestamp provided by the camera which can be disturbed relative to the timestamp of the other camera or relative to the reference signal. The method according to the invention therefore allows dating the images of at least one camera without requiring a complex connection. Furthermore, the method according to the invention is independent of the field of view of the camera.

The method is therefore simpler, more economical and more reliable than the methods of the prior art.

Furthermore, the method, by dating the images, allows dating the images with any other information dated by another system, such as another sensor on board the vehicle.

For example, the method can exploit information, for example of position, given or deduced from the images and use it with information of the same type obtained by other sensors on the same date and thus consolidate the position of the vehicle on the given date and obtain a very accurate value for it.

The modulated signal may comprise a plurality of pulses having the same base period, the retiming pulse having a period which is less than or greater than said base period. The base period can for example be of the range of 49.9 ms and the period of the retiming pulse can be equal to 52 ms, which allows having 19 base periods and 1 retiming period in 1 second. The modulated signal can be a periodic electrical signal, phase modulated, when a reference signal is received by the electronic card. The modulated signal can be obtained by a period modulation.

The modulated signal may comprise a plurality of retiming periods, instead of a single retiming period and a plurality of base periods. The combination of the different periods can encode time information slower than 1 second.

According to one embodiment, the reference signal may include at least one reference pulse, the rising edge of the retiming pulse of the modulated signal being time offset from the rising edge of the reference pulse of the reference signal, said time offset between the two rising edges being equal to the retiming period or to the retiming period plus a fixed number of periods by default.

The reference signal can be a pulse signal per second. For example, the rising edge of the reference signal can be synchronised with the start of the second of the coordinated universal time.

According to one embodiment, for each camera, the step consisting in acquiring images can be performed at each pulse of said modulated signal, for example at each rising edge of said pulses.

The reference signal can be associated with an NMEA type data frame comprising data relating to a date and a schedule of transmission of the reference signal.

The NMEA frame may comply with the NMEA 0183 standard. The NMEA frame may comprise a GGA frame carrying information relating to the schedule of transmission of the reference signal, for example the hour, the minutes, the seconds and possibly the milliseconds. The NMEA frame can comprise an RMC frame carrying information relating to the date of transmission of the reference signal, for example the year, the month and the day.

According to one embodiment, the modulated signal can be generated using a digital phase-locked loop. The input of the phase-locked loop can be linked to the global positioning system. Thus, the phase-locked loop can take the reference signal as input.

According to one embodiment, for each camera, the step consisting in determining the time difference between the timestamps of two successive images can be carried out by a computer.

The computer can be connected, on the one hand, to each of the cameras through an Ethernet link and, on the other hand, to the global positioning system. The computer can be a computer equipped with a Linux-type operating system. Thus, the method can be implemented less expensively.

According to one embodiment, the modulated signal can be generated by an electronic card connected to the global positioning system.

The electronic card can be connected to each camera, in particular to a connector for triggering said camera.

The electronic card can be configured to implement the phase-locked loop. The electronic card can be of the Arduino® type. Such a card allows reducing the implementation costs of the method and simplifying the necessary connections with the camera(s).

Each camera can comprise an internal clock configured to associate a timestamp with an image acquired by said camera. The timestamp may correspond to a duration, expressed in a time unit, accumulated since turning on said camera.

The global positioning system can be integrated into an inertial unit equipping the vehicle.

For example, the vehicle may be an autonomous or remotely controlled vehicle. The vehicle can be a land, aerial or naval vehicle.

According to another aspect of the invention, a device is proposed comprising means for implementing the aforementioned method.

The different steps of the image dating method according to the invention can be implemented by a software or a computer program. This software or program is likely to be executed by a computer or by a processor, for example a data processor, this software or program including instructions for controlling the execution of the steps of a method of the aforementioned type.

These instructions can be storable in a memory of a computing device, loaded then executed by a processor of this digital device.

This software or computer program may use any programming language, and be in the form of source code, object code, or intermediate code between source code and object code, such as in partially compiled form, or in any other desirable form.

The computer program can include instructions for the execution of the aforementioned image dating method, when said program is executed by a processor.

The invention may also relate to an information storage means, removable or not, partially or totally readable by a computer or a microprocessor, including code instructions of a computer program for the execution of each of the steps of the aforementioned method.

According to another aspect, the invention proposes a device for dating images obtained by at least one camera, for example two cameras, equipping a vehicle, comprising:
  means configured to transmit a reference signal including time information, for example a global positioning system equipping said vehicle and,
  an electronic card connected to the means for transmitting the reference signal, such as the global positioning system, and configured to generate a modulated signal in response to the reference signal, said modulated signal having at least one retiming pulse of a retiming period which is different from a base period of the modulated signal,
  In which each camera is connected to the electronic card and is configured to acquire images at a frequency depending on the frequency of the modulated signal, each image being associated with a timestamp provided by the camera, and
  said device further comprising a computer connected, on the one hand, to each camera and, on the other hand, to the means for transmitting the reference signal and configured to determine the time difference between the timestamps of two successive images of the camera and, if the time difference determined between said timestamps is different from the base period of the modulated signal, assigning a reference date to said images depending on the time information of the reference signal.

The device can comprise an inertial unit on board the vehicle and configured for example to measure a speed or an acceleration of said vehicle. The inertial unit can comprise the global positioning system.

The electronic card can be configured to implement a phase-locked loop to generate the modulated signal. The electronic card can be of the Arduino® type.

The computer can be connected, on the one hand, to each of the cameras and, on the other hand, to the global positioning system. The computer can be a computer equipped with a Linux-type operating system.

Each camera can comprise an internal clock configured to associate a timestamp with an image acquired by said camera.

According to another aspect, the invention proposes a vehicle comprising a device as previously described or means for implementing the method according to the invention.

BRIEF DESCRIPTION OF FIGURES

FIG. 3 represents an example of the method according to the invention.

DETAILED DESCRIPTION OF THE INVENTION

Figure 1:
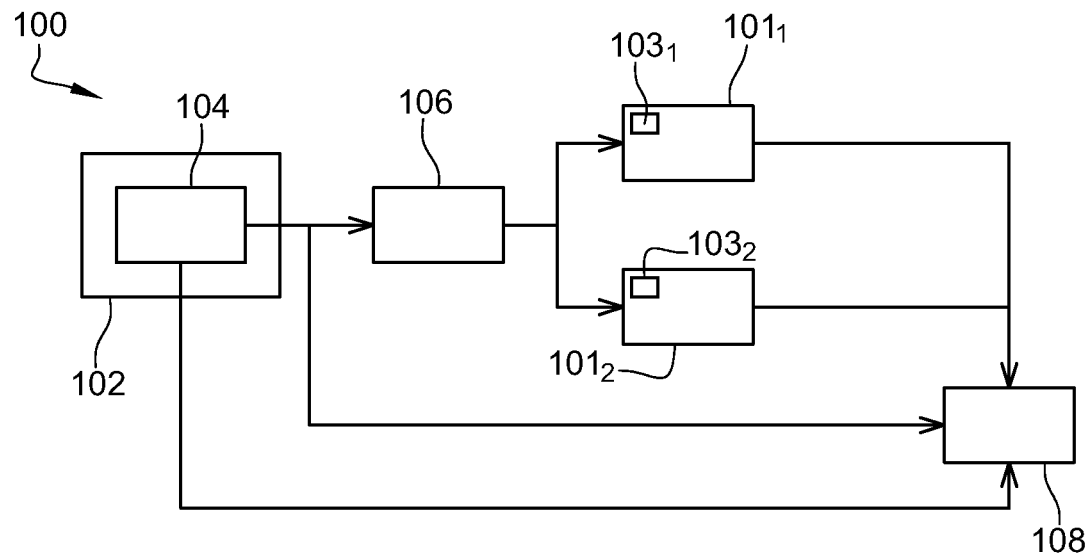
FIG. 1 is a schematic representation of an exemplary embodiment of the device according to the invention.
Figure 2:
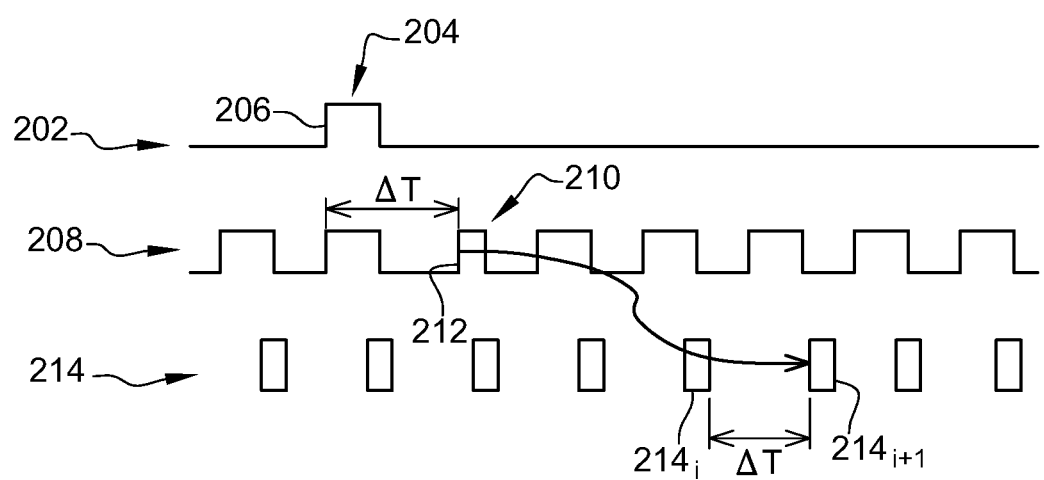
FIG. 2 is a schematic representation of the signals produced by the device of FIG. 1.

FIGS. 1 and 2 illustrate a device 100, according to one embodiment of the invention, intended to be arranged in a vehicle, for example a land vehicle. The vehicle is equipped with two cameras $101_1$ and $101_2$ to help in the navigation of the vehicle and in the exploration of the environment of the vehicle.

The device 100 comprises an inertial unit 102 equipped with a global positioning system 104, for example of the GPS ("Global Positioning System") or GNSS ("Global Navigation Satellite System") type.

The global positioning system 104 is adapted to transmit a reference signal 202, in particular a pulse per second ("PPS") signal, associated with time information, for example an NMEA frame bearing a date and schedule of transmission of the "PPS" reference signal 202. The "PPS" reference signal 202 comprises a reference pulse 204.

The device 100 also comprises an electronic card 106, for example of the Arduino® type, having an input connected to the global positioning system 104. The electronic card can have one or a plurality of outputs, at least two of the outputs being connected to cameras 101. Of course, there may be additional outputs which are not connected to cameras 101. Moreover, the vehicle can comprise more than two cameras and the electronic card 106 can be connected to all or part of the cameras. Furthermore, the electronic card 106 can have a single output connected to each of the cameras 101 or to a single camera 101.

The electronic card 106 is configured to produce at each of the outputs thereof connected to a camera 101, a modulated signal 208 having a predetermined frequency, for example a frequency which is equal to the acquisition frequency of one of the cameras 101. Alternatively, the frequency of the modulated signal can be greater than the acquisition frequency of one or each camera 101. By way of example, the frequency of the modulated signal 208 is equal to 20 Hz. The modulated signal 208 comprises a retiming pulse 210 having a rising edge 212 which is time offset from a base period of the modulated signal, such that the retiming pulse has a retiming period which is different from the base period. This retiming pulse can occur just after the rising edge 206 of the reference pulse 204. The duration of the retiming period $\Delta T$, which is different from the base period, is predetermined. The retiming period $\Delta T$ is for example greater than the base period of the modulated signal 208. Alternatively, the retiming period $\Delta T$ may be less than the base period of the modulated signal 208. The retiming period $\Delta T$ is by example equal to 52 ms. Alternatively, the retiming pulse 210 may be offset from a falling edge or another point of the PPS reference signal 202.

The vehicle can comprise two cameras 101 forming a stereo head arranged in a front portion of the vehicle having an image acquisition frequency of 20 Hz. The vehicle can also comprise a camera 101 arranged in a rear portion of the vehicle and configured to reading plates or road signs for example, and having an image acquisition frequency of 10 Hz.

The output(s) of the electronic card 106 can be connected to the connectors for triggering the cameras 101.

The electronic card 106 may implement a digital phase-locked loop to create the signal 208.

The electronic card 106 is configured to trigger an acquisition of the images 214 by the cameras 101 depending on the modulated signal 208. For example, each of the cameras 101 captures an image at each rising edge of the modulated signal 208.

The cameras 101 can be any type of camera, for example infrared cameras, thermal cameras, matrix cameras, linear cameras, etc.

Each of the cameras $101_1$ and $101_2$ comprises an internal clock $103_1$ and $103_2$ configured to associate a timestamp with the images 214 taken by said camera. The internal clocks $103_1$ and $103_2$ can be desynchronised with each other.

The device 100 comprises a computer 108 connected to the inertial unit 102 and is configured to receive the PPS reference signal 202 from the global positioning system. The computer 108 is also connected to each of the cameras 101 and is configured to receive the images 214 captured by each of the cameras 101.

The computer 108 receives from the global positioning system an NMEA type data frame. The NMEA frame comprises an RMC frame carrying information relating to the date of transmission of the PPS reference signal, for example the year, the month and the day, and a GGA frame carrying information relating to the schedule of transmission of the PPS reference signal, for example the hour, the minutes, the seconds and possibly the milliseconds.

The computer 108 is further configured to determine a difference between the consecutive image timestamps $214_i$ and $214_{i+1}$. When the computer 108 determines a timestamp difference which is different from the base period, a reference date determined by the time information carried by the PPS reference signal is assigned to the image $214_{i+1}$, for example by the date and the schedule carried by the NMEA frame. Reference dates are also assigned to the images preceding and/or following the image $214_{i+1}$ according to the reference date of the image $214_{i+1}$. Thus, the device 100 allows dating the images of the cameras 101 with a standard connection and therefore without requiring a specific connection between the two cameras. This device also allows compensating for the drift or a poor configuration of the internal clocks 103 of the cameras 101. The device also allows compensating for the latencies due to the acquisition of the images and their transmission to the computer. Furthermore, the device allows dating the images even in the case of loss of an image. The determination of the difference between the timestamps of the acquired images allows finding the dates of the images as soon as the offset corresponding to the retiming pulse is detected. For example, the device 100 allows dating the images with an accuracy of less than 1 ms.

FIG. 3 represents an example of a method 300 which can be implemented by the device 100.

The method 300 is provided for dating the images obtained by one or more cameras equipping a vehicle, for example an autonomous vehicle.

The method 300 comprises:
- a step 302 consisting in acquiring a reference signal including time information transmitted by a global positioning system equipping the vehicle, and
- a step 304 consisting in generating a modulated signal in response to the reference signal, said modulated signal having at least one retiming pulse having a retiming period which is different from the base period of the modulated signal.

The reference signal may be the signal 202 of FIG. 2. The time information may be an NMEA data frame. The global positioning system may be the positioning system 104 of FIG. 1. For example, the modulated signal can be the modulated signal 208 of FIG. 2.

Furthermore, step 304 can be executed by an electronic card, for example the electronic card 106 of FIG. 1.

The method 300 also comprises, for each camera:
- a step 306 consisting in acquiring images at a frequency depending on the frequency of the modulated signal, each image being associated with a timestamp provided by the camera,
- a step 308 consisting in determining the time difference between the timestamps of two successive images of the camera and, if the time difference determined between said timestamps is different from, for example, greater than or equal to the retiming period, assigning a reference date to said images depending on the time information of the reference signal.

For example, the cameras can be the cameras 101 of FIG. 1. The method can comprise, for each camera, a step consisting in capturing an image for each rising edge of the modulated signal.

The timestamp provided by the camera can be obtained by an internal clock of said camera. Step 308 can be executed by a computer, for example the computer 108 of FIG. 1.

The invention claimed is:

1. A method for dating images obtained by at least one camera equipping a vehicle, said method comprising the steps consisting in:
   acquiring a reference signal including time information,
   generating a modulated signal in response to the reference signal, said modulated signal having at least one retiming pulse having a retiming period ($\Delta T$) which is different from a base period of the modulated signal, and
   for each camera:
   acquiring images at a frequency depending on the frequency of the modulated signal, each image being associated with a timestamp provided by the camera, and
   determining a time difference between the timestamps of two successive images of the camera and, if the time difference determined between said timestamps is different from the base period of the modulated signal, assigning a reference date to said images depending on the time information of the reference signal.

2. The method according to claim 1, wherein the modulated signal comprises a plurality of pulses having a same base period, the retiming pulse having a period which is less than or greater than said base period.

3. The method according to claim 1, wherein the reference signal includes at least one reference pulse, a rising edge of the retiming pulse of the modulated signal being time offset from a rising edge of the reference pulse of the reference signal, said time offset between the two rising edges being equal to a retiming period or to the retiming period plus a fixed number of periods by default.

4. The method according to claim 1, wherein, for each camera, the step consisting of acquiring images is performed at each pulse of said modulated signal.

5. The method according to claim 4, wherein, for each camera, the step of acquiring images is performed at each rising edge of said pulses.

6. The method according to claim 1, wherein the reference signal is associated with an NMEA type data frame comprising data relating to a date and a schedule of transmission of the reference signal.

7. The method according to claim 1, wherein the modulated signal is generated using a digital phase-locked loop.

8. The method according to claim 1, wherein, for each camera, the step consisting in determining the time difference between the timestamps of two successive images is carried out by a computer.

9. The method according to claim 1, wherein the modulated signal is generated by an electronic card connected to a global positioning system.

10. A computer program including instructions for the execution of a method according to claim 1 when said program is executed by a processor.

11. Information storage means, removable or not, partially or totally readable by a computer or a microprocessor including code instructions of a computer program for executing each of the steps of the method according to claim 1.

12. A device for dating images obtained by at least one camera equipping a vehicle, comprising:
   means configured to transmit a reference signal including time information,
   an electronic card connected to the means for transmitting the reference signal and configured to generate a modulated signal in response to the reference signal, said modulated signal having at least one retiming pulse having a retiming period ($\Delta T$) which is different from a base period of the modulated signal,
   wherein each camera is connected to the electronic card and is configured to acquire images at a frequency depending on the frequency of the modulated signal, each image being associated with a timestamp provided by the camera, and
   said device further comprising a computer connected, on the one hand, to each camera and, on the other hand, to the means for transmitting the reference signal and configured to determine a time difference between the timestamps of two successive images of the camera and, if the time difference determined between said timestamps is different from the base period of the modulated signal, assigning a reference date to said images depending on the time information of the reference signal.

13. The method of claim 1, wherein the reference signal is transmitted by a global positioning system equipping said vehicle.

* * * * *